(12) United States Patent
Ohnishi

(10) Patent No.: US 8,988,554 B2
(45) Date of Patent: Mar. 24, 2015

(54) APPARATUS AND METHOD FOR VIDEO RECORDING

(75) Inventor: Shinji Ohnishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 854 days.

(21) Appl. No.: 13/089,516

(22) Filed: Apr. 19, 2011

(65) Prior Publication Data

US 2011/0273586 A1    Nov. 10, 2011

(30) Foreign Application Priority Data

May 10, 2010  (JP) ................................. 2010-108677

(51) Int. Cl.
| | |
|---|---|
| H04N 5/76 | (2006.01) |
| G11B 27/034 | (2006.01) |
| G11B 27/34 | (2006.01) |
| H04N 5/775 | (2006.01) |
| H04N 9/804 | (2006.01) |
| H04N 9/82 | (2006.01) |

(52) U.S. Cl.
CPC .............. *G11B 27/034* (2013.01); *G11B 27/34* (2013.01); *H04N 5/775* (2013.01); *H04N 9/8042* (2013.01); *H04N 9/8205* (2013.01)
USPC ..................................... 348/231.1; 348/231.2

(58) Field of Classification Search
USPC ...................................................... 348/231.1
See application file for complete search history.

(56) References Cited

U.S. PATENT DOCUMENTS

| | | | |
|---|---|---|---|
| 7,423,683 B2 | 9/2008 | Inoue et al. | |
| 7,768,553 B2 | 8/2010 | Kamiya | |
| 2001/0048472 A1* | 12/2001 | Inoue et al. | 348/207 |
| 2004/0227825 A1* | 11/2004 | Sakimura et al. | 348/239 |
| 2007/0115368 A1 | 5/2007 | Kamiya | |
| 2011/0242360 A1* | 10/2011 | Mori | 348/231.1 |

FOREIGN PATENT DOCUMENTS

| | | |
|---|---|---|
| CN | 1335712 A | 2/2002 |
| CN | 1551614 A | 1/2004 |
| CN | 1968391 A | 5/2007 |
| JP | 2006-174318 | 6/2006 |

OTHER PUBLICATIONS

Jun. 9, 2013 Chinese Office Action, that issued in Chinese Patent Application No. 201110120232.

* cited by examiner

*Primary Examiner* — James Hannett
*Assistant Examiner* — Yih-Sien Kao
(74) *Attorney, Agent, or Firm* — Cowan, Liebowitz & Latman, P.C.

(57) ABSTRACT

A video recording apparatus is provided that can provide the user with information as to whether or not scheduled image captures will fit into a recording medium or information as to how many retakes are possible. The apparatus obtains, for each scene to be captured, the duration of a cut to be captured from scenario information in which the duration of each of the cuts constituting the scene is specified. The recordable duration is calculated from the remaining capacity of the recording medium in which video data is to be recorded and a recording bit rate of the video data, and the number of image captures that can be taken for the cut to be captured is calculated from the calculated recordable duration and the obtained duration. The calculated recordable duration and the calculated number of image captures that can be taken are displayed on a display unit.

14 Claims, 16 Drawing Sheets

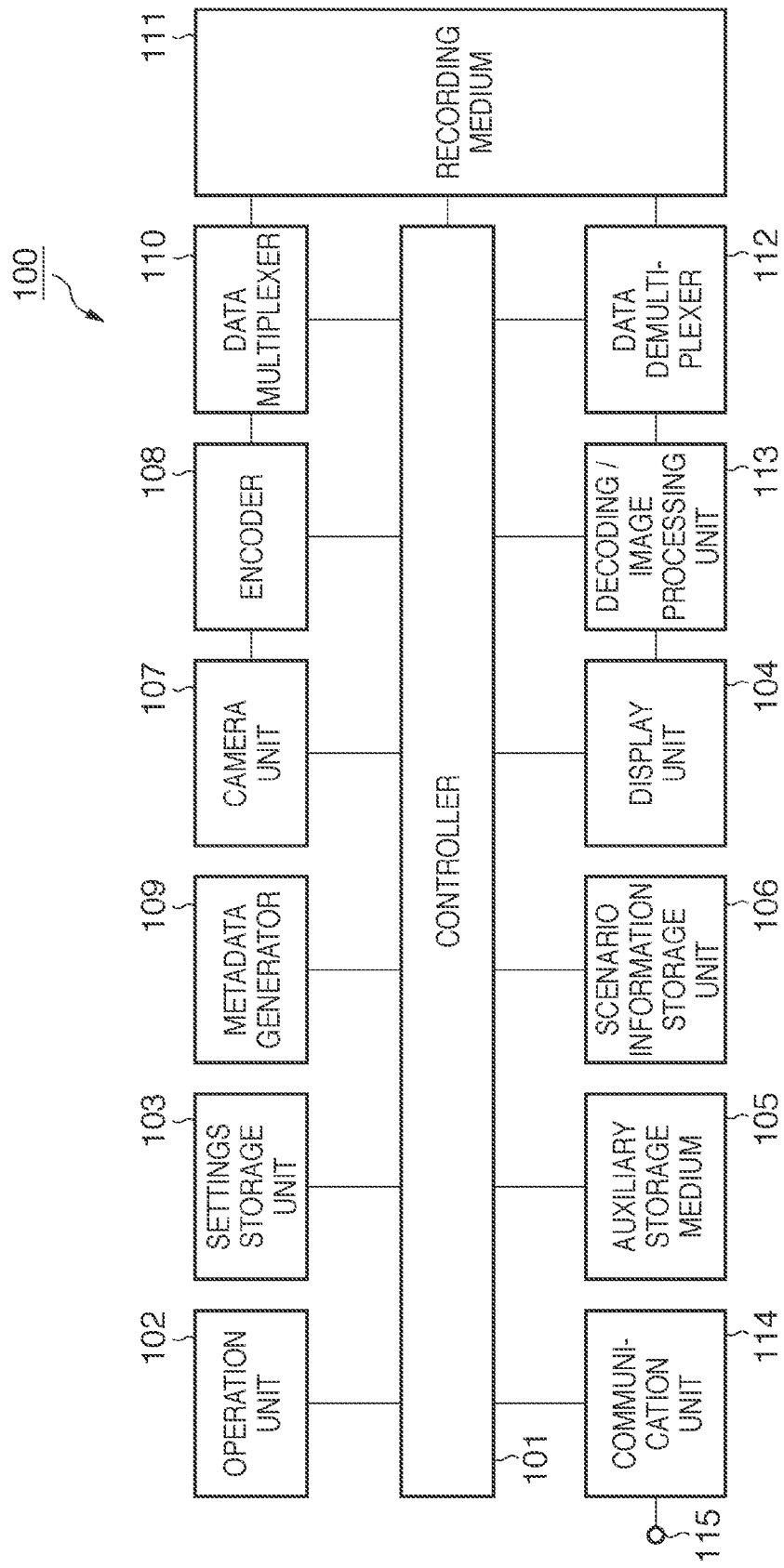

F I G. 2

```xml
<scenario>
  <scene number=1>
    <title>PARK</title>
    <cut number=1>
      <description>PARK ENTRANCE</description>
      <duration>00:01:00</duration>
      <take>0</take>
    </cut>
    <cut number=2>
      <description>PARK ENTRANCE TO FLOWER GARDEN</description>
      <duration>00:01:30</duration>
      <take>0</take>
    </cut>
    <cut number=3>
      <description>FLOWER PICKING AT FLOWER GARDEN</description>
      <duration>00:02:30</duration>
      <take>0</take>
    </cut>
    <cut number=4>
      <description>PATH AROUND POND</description>
      <duration>00:01:00</duration>
      <take>0</take>
    </cut> <scene>
    <cut number=5>
      <description>CONVERSATION ON BENCH</description>
      <duration>00:01:30</duration>
      <take>0</take>
    </cut> </scene>
  <scene number=2>
    <title>STATION</title>
    <cut number=1>
      <description>TICKET VENDING MACHINE TO TICKET GATE</description>
      <duration>00:01:00</duration>
      <take>0</take>
    </cut>
    <cut number=2>
      <description>WAITING FOR TRAIN ON PLATFORM</description>
      <duration>00:00:30</duration>
      <take>0</take>
    </cut>
    <cut number=3>
      <description>TRAIN LEAVES STATION AND DISAPPEARS INTO DISTANCE</description>
      <duration>00:00:45</duration>
      <take>0</take>
    </cut>
  </scene>
</scenario>
```

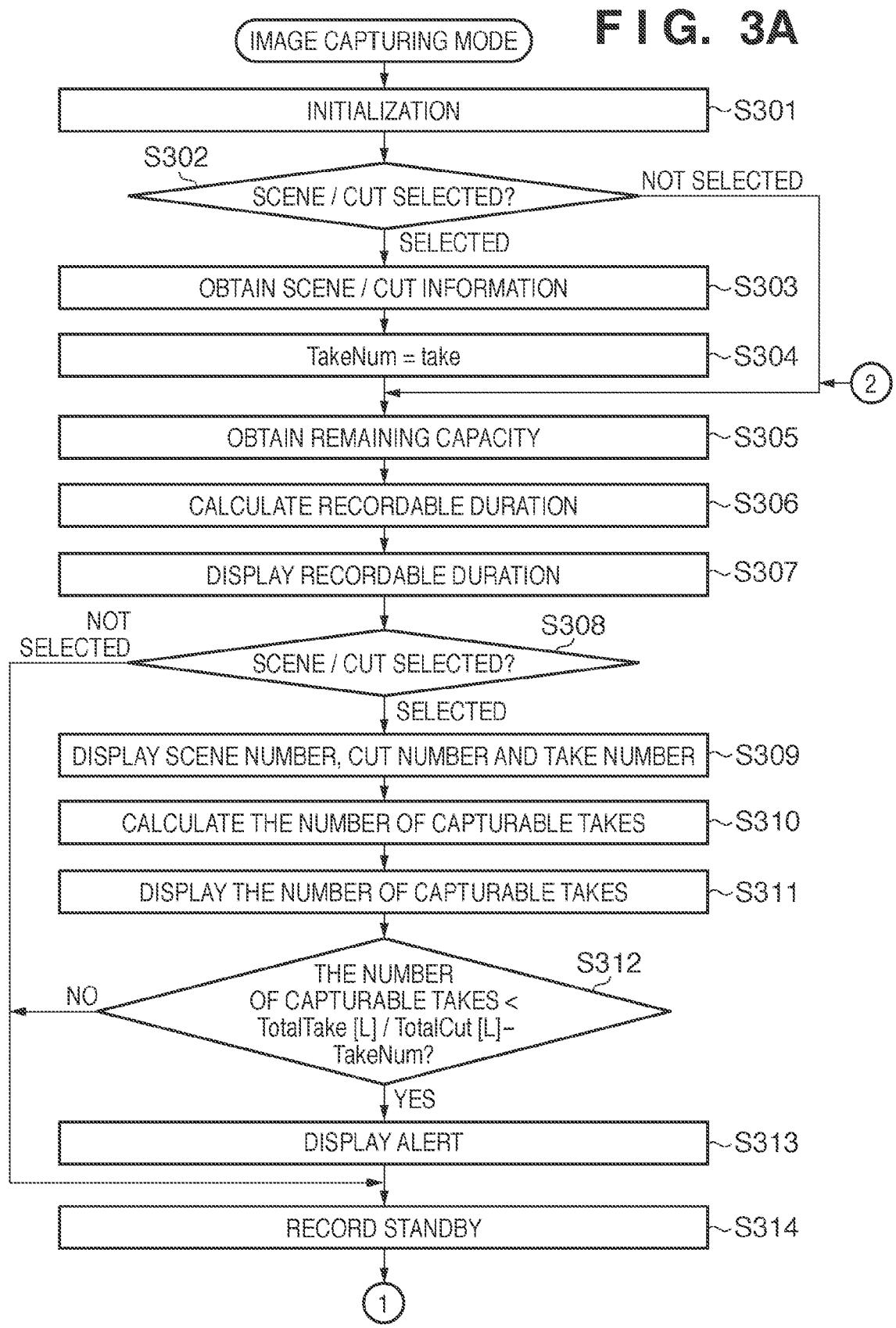

F I G. 7C
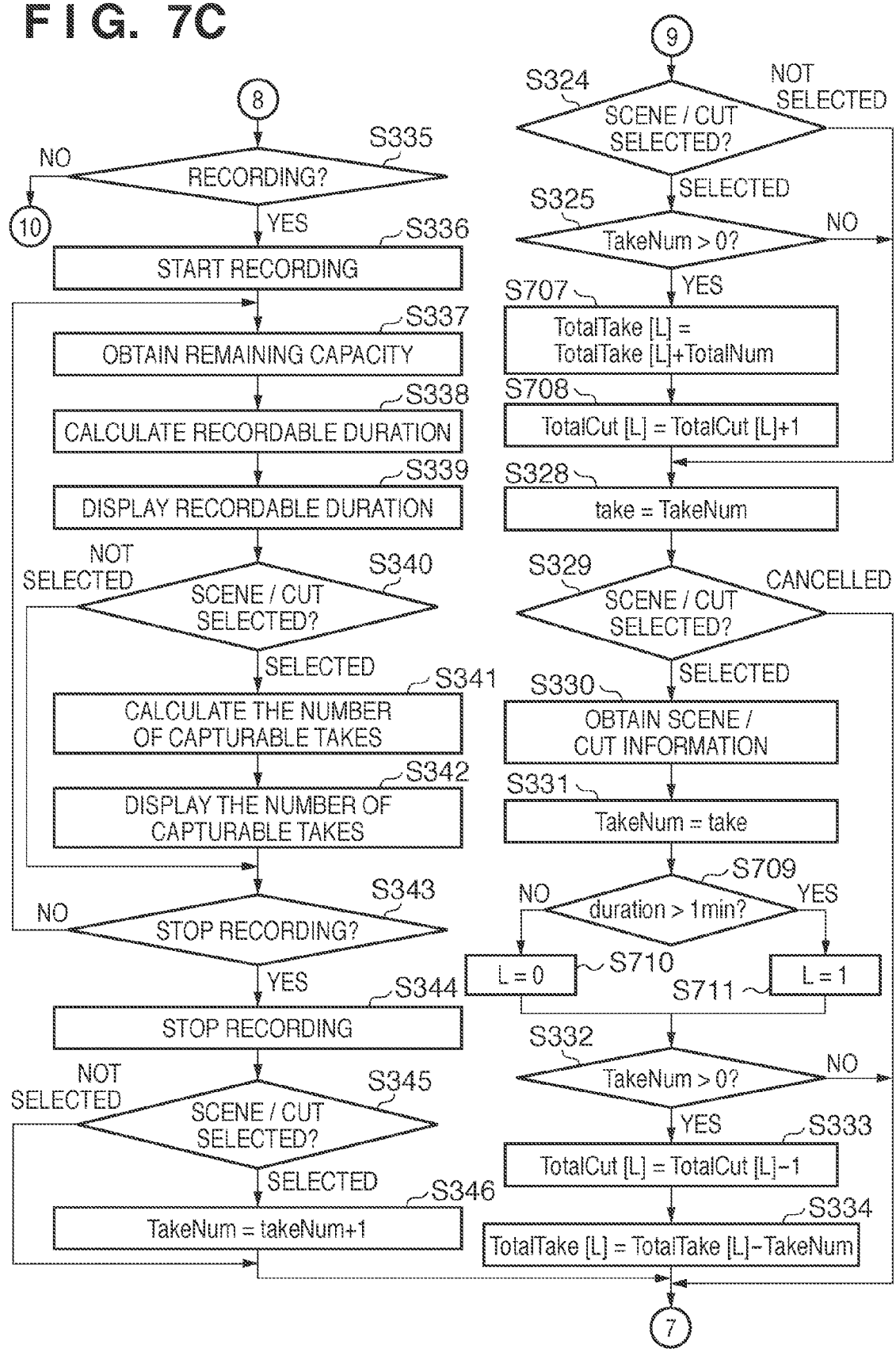

FIG. 9A

| SCENE NUMBER | SCENE NAME | CUT NUMBER | CONTENT OF CUT | CUT LENGTH |
|---|---|---|---|---|
| 1 | PARK | 1 | PARK ENTRANCE | 1 MIN. 00 SEC. |
| | | 2 | PARK ENTRANCE TO FLOWER GARDEN | 1 MIN. 30 SEC. |
| | | 3 | FLOWER PICKING AT FLOWER GARDEN | 2 MIN. 30 SEC. |
| | | 4 | PATH AROUND POND | 1 MIN. 00 SEC. |
| | | 5 | CONVERSATION ON BENCH | 1 MIN. 30 SEC. |
| 2 | STATION | 1 | TICKET VENDING MACHINE TO TICKET GATE | 1 MIN. 00 SEC. |
| | | 2 | WAITING FOR TRAIN ON PLATFORM | 0 MIN. 30 SEC. |
| | | 3 | TRAIN LEAVES STATION AND DISAPPEARS INTO DISTANCE | 0 MIN. 45 SEC. |

FIG. 9B

| BIT RATE NUMBER | BIT RATE |
|---|---|
| 1 | 18Mbps |
| 2 | 25Mbps |
| 3 | 35Mbps |

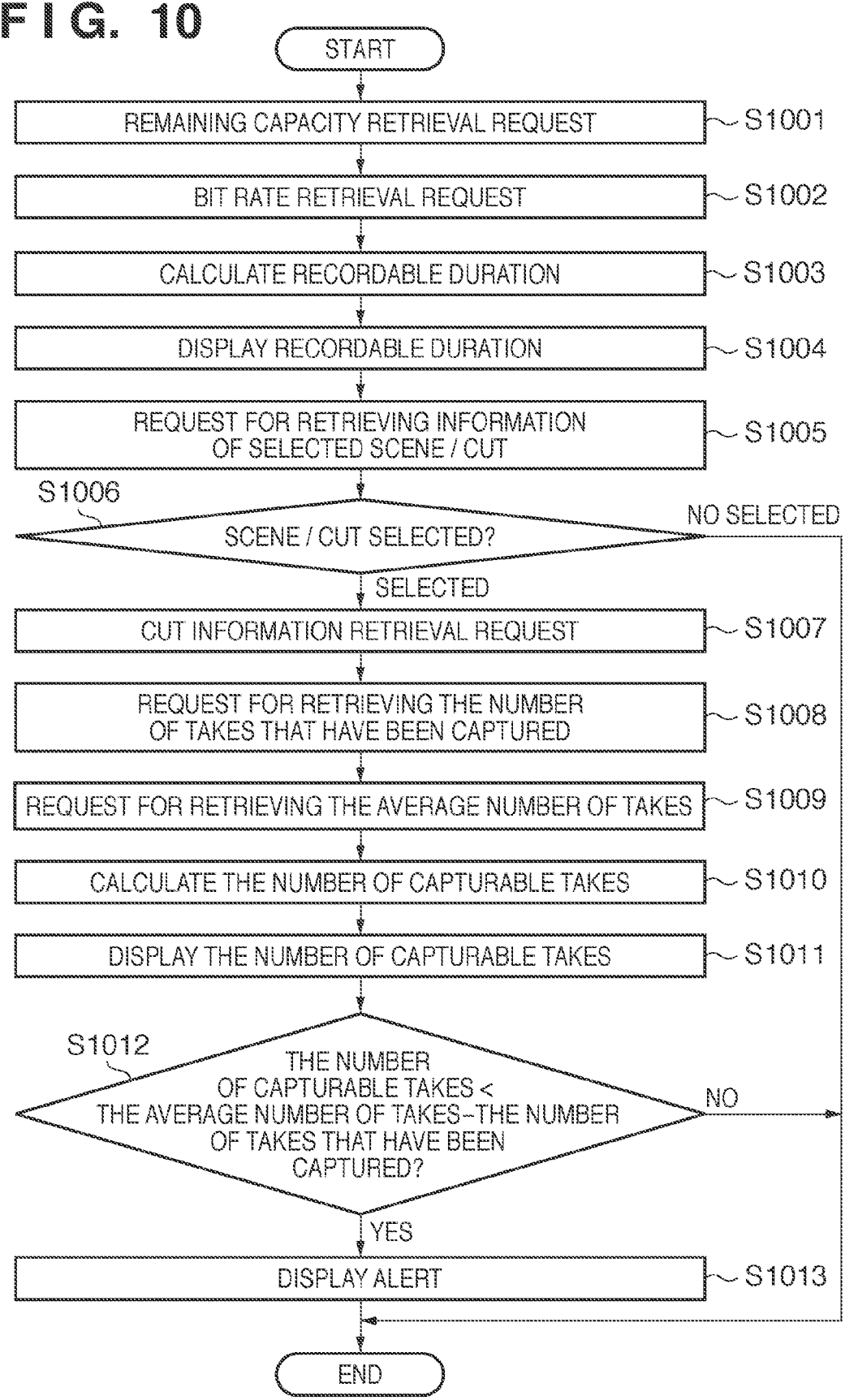

APPARATUS AND METHOD FOR VIDEO RECORDING

BACKGROUND OF THE INVENTION

1. Field of the Invention

The present invention relates to a technique for displaying the remaining capacity of a recording medium in a video recording apparatus.

2. Description of the Related Art

In the case of filming a TV series, a movie or the like, the image capturing is carried out in units called "scenes", each composed of a series of video images representing one sequence, and "cuts" (or shots), which are individual video images constituting a scene. FIG. 9A shows an example of scenario information for managing scenes and cuts. The scenes and cuts are numbered. Scene 1 is composed of five cuts, and Scene 2 is composed of three cuts. For each cut, the cut length, which is a rough indication of the duration of image capturing, is specified. It may be the case that image capturing is performed while managing the progress of image capturing using such scenario information and the like. A single image capture for a given scene/cut is called a "take". When image capturing is performed in line with the scenario, generally, multiple takes are captured for each cut due to an actor or actress making a mistake, an error during image capture and the like.

In recent years, conventional magnetic tape used as recording media for video cameras is being replaced by file-based recording media using magnetic disks and flash memories. With a file-based video camera, it is possible to select a scene/cut number for which image capturing is to be carried out, and record the scene number, the cut number, the take number and the like as metadata in the captured moving image file.

For example, Japanese Patent Laid-Open No. 2006-174318 discloses a technique in which scenario data for use in image capturing, including the details of image capturing, dialogs, the scene/cut number and the like, is input before image capturing, and image capturing guidance is carried out in accordance with the scenario data.

FIG. 4A shows an example of a display screen of a conventional video camera during an image capturing mode. Reference numeral 401 indicates a display region for displaying subjects who are being captured and image capturing information, 402 indicates a display of the remaining capacity of the recording medium, 403 indicates an indicator indicating the state of image capturing, and 404 indicates a time code display. The remaining capacity 402 of the recording medium is displayed in time units. Such a display, however, is problematic in that it is difficult for the user to recognize whether or not the length of the scenes/cuts that are scheduled for image capturing will fit into the recording medium.

SUMMARY OF THE INVENTION

The present invention provides a video recording apparatus capable of providing the user with information as to whether or not scheduled image captures will fit into the recording medium or information as to how many retakes are possible.

According to one aspect of the present invention, there is provided a video recording apparatus that records video data obtained by image capturing in a recording medium, the apparatus comprising: an image capturing unit configured to obtain scenario information in which a duration of each of a plurality of cuts that are scheduled for image capturing is specified, and perform image capturing in accordance with the scenario information; an obtaining unit configured to obtain the duration of a cut to be captured from the scenario information; a calculation unit configured to calculate a recordable duration from a remaining capacity of the recording medium and a recording bit rate of the video data, and calculate the number of image captures that can be taken for the cut to be captured from the calculated recordable duration and the duration obtained by the obtaining unit; and a display unit configured to display the number of image captures that can be taken for the cut to be captured calculated by the calculation unit.

According to another aspect of the present invention, there is provided a control method of a video recording apparatus that records video data obtained by image capturing in a recording medium, the apparatus including an image capturing unit that obtains scenario information in which a duration of each of a plurality of cuts that are scheduled for image capturing is specified and performs image capturing in accordance with the scenario information, the method comprising the steps of: obtaining the duration of a cut to be captured from the scenario information; calculating a recordable duration from a remaining capacity of the recording medium and a recording bit rate of the video data, and calculating the number of image captures that can be taken for the cut to be captured from the calculated recordable duration and the obtained duration; and displaying the calculated number of image captures that can be taken for the cut to be captured.

Further features of the present invention will become apparent from the following description of exemplary embodiments with reference to the attached drawings.

BRIEF DESCRIPTION OF THE DRAWINGS

FIG. 1 is a block diagram showing a configuration of a video camera according to an embodiment of the present invention.

FIG. 2 is a diagram showing an example of a scenario information file according to the embodiment of the present invention.

FIGS. 3A to 3C are flowcharts illustrating operations of the video camera according to the embodiment of the present invention.

FIGS. 7A to 7C are flowcharts illustrating operations of the video camera according to an embodiment of the present invention.

FIG. 9A is a diagram showing an example of scenario information for managing scenes and cuts.

FIG. 9B is a diagram showing example recording bit rates supported by the video camera according to the embodiment of the present invention.

FIG. 10 is a flowchart illustrating operations of the remote controlling device according to the embodiment of the present invention.

DESCRIPTION OF THE EMBODIMENTS

Figure 3B:
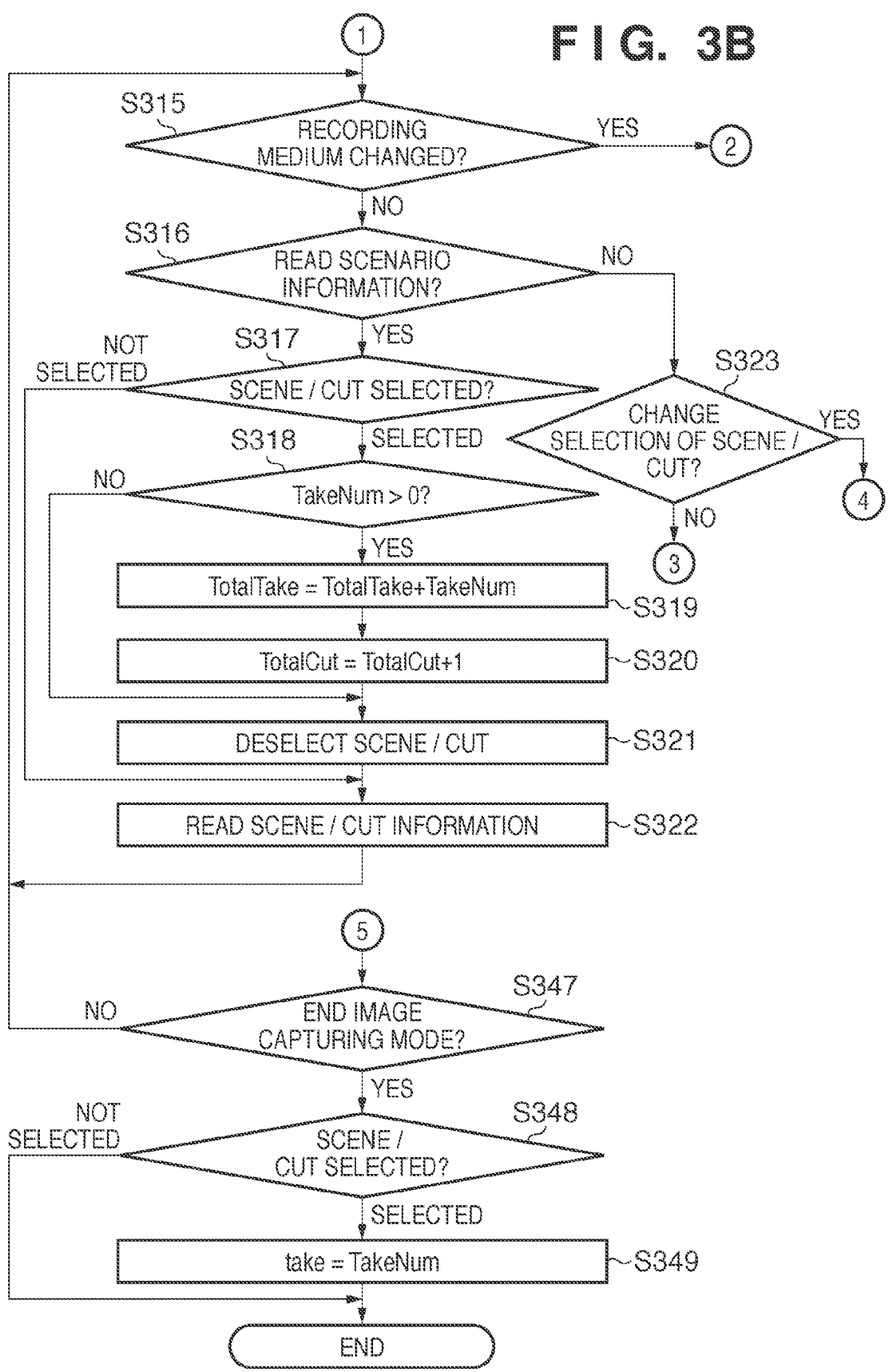

Hereinafter, preferred embodiments of the present invention will be described in detail with reference to the accompanying drawings. It should be understood that the present invention is not limited to the embodiments given below, and the embodiments merely illustrate advantageous specific examples for carrying out the present invention. Also, not all combinations of the features described in the following embodiments are necessarily essential to solve the problems of the present invention.

FIG. 1 is a block diagram showing a configuration of a video camera 100 that is a video recording apparatus according to an embodiment of the present invention. A controller 101 performs overall control of operations of the video camera 100. A user can operate the video camera 100 via an operation unit 102. A settings storage unit 103 stores data regarding functional settings of the video camera 100. The settings storage unit 103 is composed of, for example, a non-volatile memory or battery backup memory capable of holding stored content even when the power is turned off. A display unit 104 displays video images output by a camera unit 107, which will be described later, video images reproduced from a recording medium, user operation menus and various kinds of information. An auxiliary storage medium 105 is a removable memory for supplying scenario information, which will be described later. A scenario information storage unit 106 stores the scenario information supplied from the auxiliary storage medium 105 as well as data related to the scenario information. The scenario information storage unit 106 is composed of, for example, a non-volatile memory or battery backup memory capable of holding stored content even when the power is turned off.

The camera unit 107 includes a lens (not shown), a CMOS image sensor and the like, and outputs an image signal acquired by image capturing. An encoder 108 encodes the image signal output by the camera unit 107. A metadata generator 109 generates metadata that is additional image information. A data multiplexer 110 multiplexes the video data encoded by the encoder 108 and the metadata generated by the metadata generator 109 into a file. A recording medium 111 records the file output from the data multiplexer 110. A data demultiplexer 112 separates the file read from the recording medium 111 into video data and metadata. A decoding/image processing unit 113 decodes the encoded video data separated by the data demultiplexer 112 and performs various processes on the decoded video data. A communication unit 114 performs communication with external devices via a connection terminal 115.

Next, operations of the video camera 100 according to the present embodiment will be described. The video camera 100 has, as its operation modes, an image capturing mode for recording an image signal acquired by image capturing in the recording medium 111 as a file and a reproduction mode for reproducing the file recorded in the recording medium 111. When the user selects the image capturing mode via the operation unit 102, the video camera 100 performs initialization, and the camera unit 107 performs photoelectric conversion on an image input through the lens and outputs the image as a digital image signal. The display unit 104 displays the digital image signal as a monitor image. When the user issues an instruction to read scenario information via the operation unit 102, the controller 101 reads a scenario information file recorded in the auxiliary storage medium 105, and stores the file in the scenario information storage unit 106.

FIG. 2 shows an example of the scenario information file. The scenario information file shown in FIG. 2 is an XML file in which the details of the scenario information shown in FIG. 9A are specified in XML. The XML file can be created using a personal computer or the like, and is supplied by being recorded in the auxiliary storage medium 105. Each piece of scene information shown in FIG. 9A has been grouped as a scene element using <scene> and </scene> tags, and each scene number has been set in the number attribute of the <scene> tag. Scene name has been set as a title element in the scene element. Each piece of cut information of a scene has been grouped as a cut element using <cut> and </cut> tags in the scene element, and each cut number has been set in the number attribute of the <cut> tag. The content of each cut has been set as a description element in the cut element. Also, the cut length that indicates the duration of each cut that is scheduled for image capturing has been set as a duration element in the cut element. The cut element also includes a take element that indicates the number of takes that have been captured for the cut. When the XLM file is created using a personal computer or the like, because image capturing for the cuts has not yet been performed, 0 is set as the number of takes that have been captured.

The video camera 100 has a scene/cut setting function for setting scene numbers and cut numbers to be captured. With this function, the user can set a scene number and a cut number to be captured through operation of the operation unit 102. Information as to whether or not a scene number and a cut number have been set using the scene/cut setting function, as well as the set scene number and cut number, are stored in the settings storage unit 103. The data stored in the settings storage unit 103 is read out during initialization for the image capturing mode, and the state of the image capturing mode when the image capturing mode was set the last time is restored. Also, the controller 101 obtains information regarding the set scene number and cut number from the scenario information stored in the scenario information storage unit 106. The controller 101 obtains the remaining capacity of the recording medium 111 and displays, on the display unit 104, the number of takes capturable for the set cut based on the scene/cut information obtained from the scenario information.

Figure 3C:
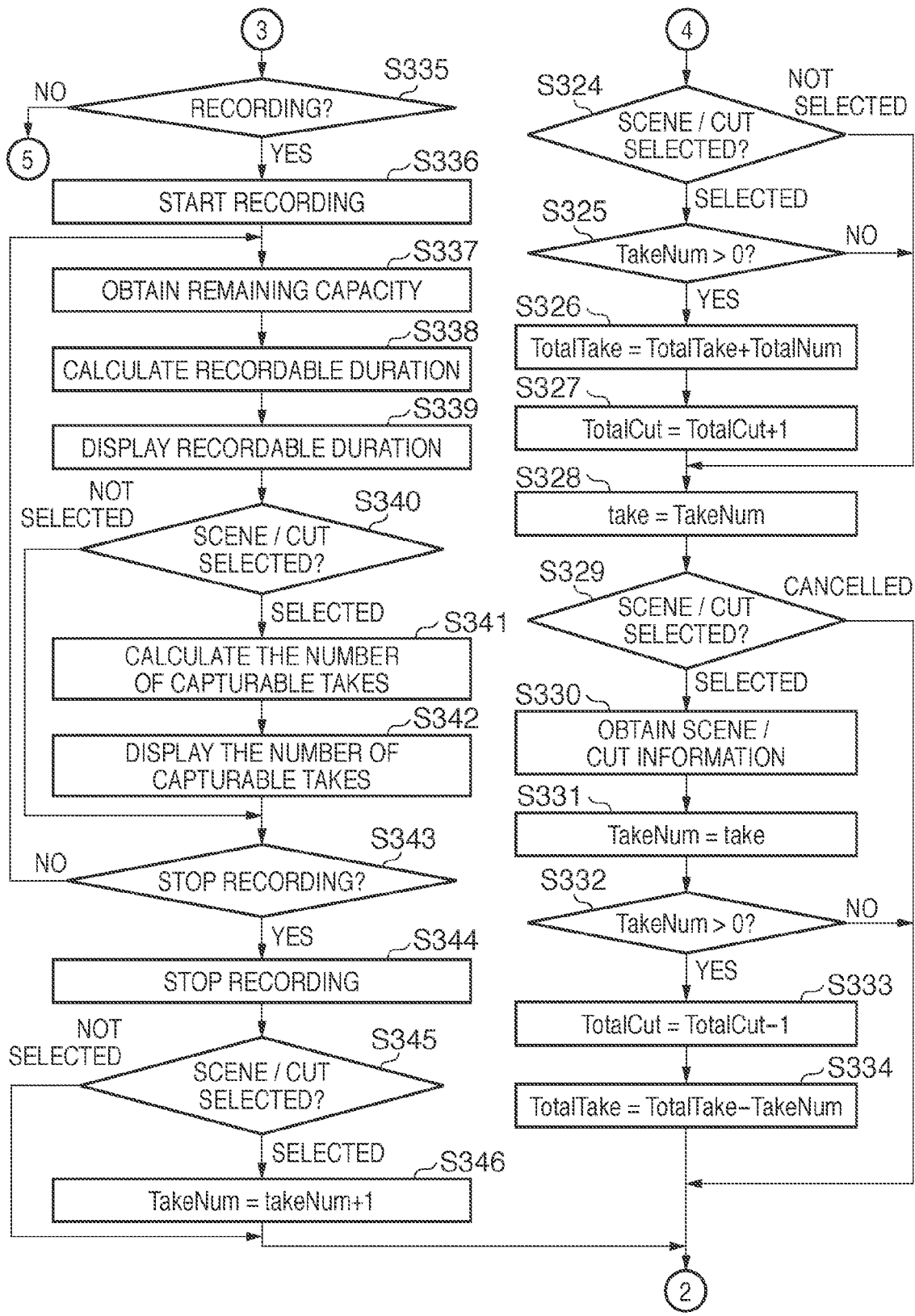

Hereinafter, the operations for displaying the number of takes described above will be described in detail with reference to the flowchart shown in FIGS. 3A to 3C. When the user turns on the power of the video camera and sets the image capturing mode, in S301, the controller 101 initializes the video camera 100, reads out the information that was set by the user when the image capturing mode was set the last time from the settings storage unit 103, and performs functional settings, internal variable settings and the like. In S302, it is determined, based on the information read out from the settings storage unit 103, whether or not a scene number and a cut number that are to be captured were selected when the image capturing mode was set the last time. If it is determined that a scene number and a cut number that are to be captured were selected, in S303, the scene number and cut number that were selected as a scene number and cut number that are to be captured are set. After that, scene information and cut information corresponding to the scene number and cut number are obtained from the scenario information stored in the scenario information storage unit 106. In S304, the number of takes that have been captured is obtained from the obtained cut information and set in an internal variable TakeNum.

In S305, the remaining capacity of the recording medium 111 is obtained. In S306, the recordable duration for the current settings is calculated from the obtained remaining capacity and the recording bit rate set in the video camera 100. In S307, the calculated recordable duration is displayed on the display unit 104. In S308, it is determined whether or not a scene and a cut have been selected using the scene/cut setting function. If it is determined that a scene and a cut have been selected, in S309, the selected scene number and cut number as well as the take number that is to be captured next are displayed. In S310, the number of takes capturable with the current settings is calculated from the recordable duration calculated in S306 and the cut duration set in the duration element of the cut information obtained in S303. In S311, the number of image captures available (the number of takes capturable) for the cut calculated in S310 is displayed.

Figure 4A:
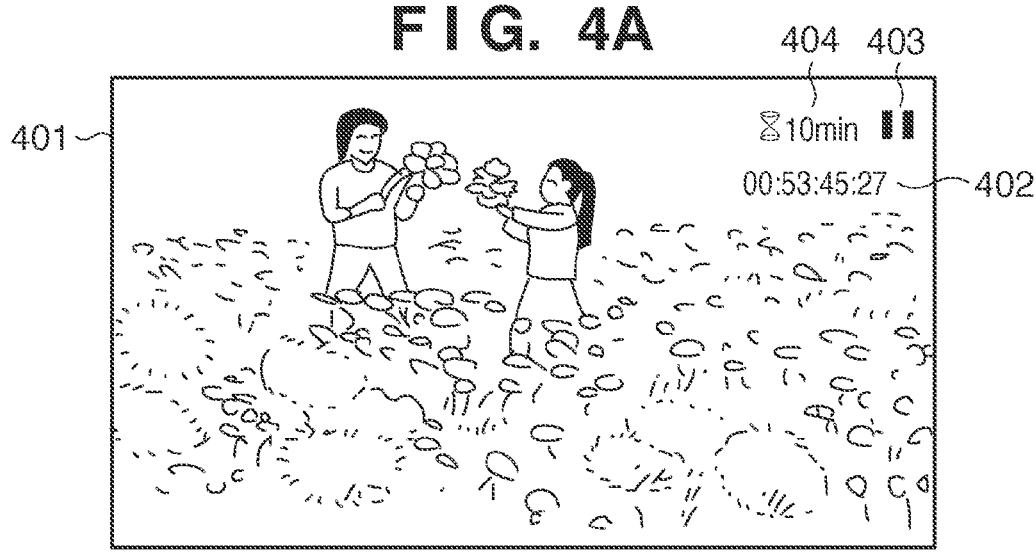
FIG. 4A is a diagram showing an example of a display screen of a conventional video camera.
Figure 4B:
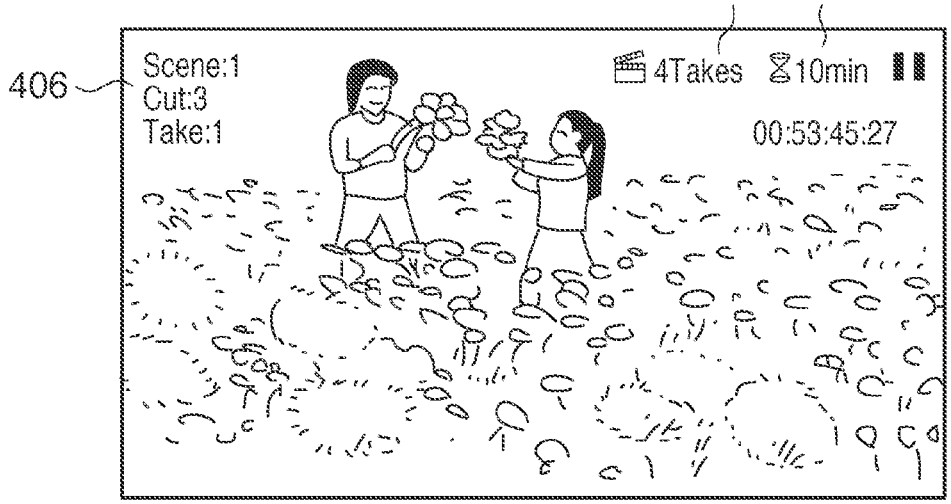
FIGS. 4B to 4E are diagrams showing examples of a display screen of the video camera according to the embodiment of the present invention.

FIG. 4B shows an example of displaying recordable duration, scene number, cut number, take number, and the number of capturable takes. Reference numeral 405 indicates a display of recordable duration. Here, it indicates that image capturing is possible for 10 minutes. Reference numeral 406 indicates a display of scene number, cut number and take number. Here, it is indicated that the cut number 3 of the scene number 1 has been selected for image capturing, and the take number is 1, indicating that image capturing that is to be taken is the first take. Reference numeral 407 indicates a display of the number of takes capturable for the selected cut. In the example shown FIGS. 2 and 9A, the cut length of the cut number 3 of the scene number 1 is 2 minutes and 30 seconds, and thus it indicates that four takes can be captured for the selected cut for the recordable duration of 10 minutes.

In S312, it is determined whether or not the number of capturable takes that was calculated in S310 is smaller than a predetermined threshold. In the present embodiment, the threshold is set with reference to the average number of image captures (the average number of takes) of the cuts captured in the past. TotalTake is an internal variable that holds the total number of takes captured in the past, and TotalCut is an internal variable that holds the total number of cuts captured in the past. The value obtained by subtracting the number of takes (TakeNum) that have been captured for the currently selected scene/cut from the average number of takes in the past (TotalTake/TotalCut) is set as the threshold. Because the value obtained by subtracting the number of takes that have been captured from the total number of takes expected to be taken for the selected scene/cut (the average number of takes in the past) is used, the threshold indicates the number of takes expected to be captured for the selected scene/cut. By determining whether or not the number of capturable takes is less than the threshold in S312, it is possible to determine whether or not the probability that video data acquired by image capturing for the selected scene/cut can be recorded in the recording medium 111 including retakes is high. If the number of capturable takes is less than the threshold, it is regarded as highly likely that all of the takes for the selected scene/cut cannot be recorded, and an alert is displayed in S313.

Figure 4C:
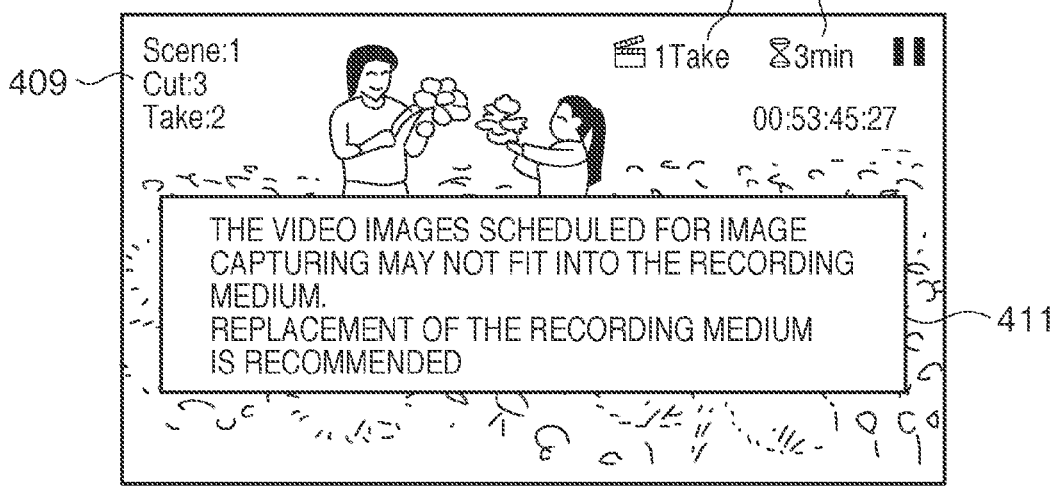

FIG. 4C shows an example of an alert display. In this example, it is assumed that the average number of takes in the past is 3. Reference numeral 408 indicates recordable duration, and 3 minutes is displayed. The cut length of the cut number 3 of the scene number 1 currently selected, indicated by reference numeral 409, is 2 minutes and 30 seconds, and therefore 1 is displayed as the number of capturable takes indicated by 410. In 409, 2 is displayed as the take number, indicating that the first take has already been captured and the take number that is to be captured next is the second take for this cut. Because the average number of takes in the past is 3, it is highly likely that three takes will be taken for this cut, and because the next take is the second take, it is highly likely that two takes will be taken for the cut number 3 of the scene number 1. However, the number of capturable takes is 1, and thus an alert message as indicated by 411 is displayed. The alert message 411 may include a message that prompts the user to replace the recording medium. The user can replace the recording medium with a recording medium having a sufficient remaining capacity, upon confirming the alert message. In the present embodiment, an example has been described in which the threshold is set with reference to the average number of takes of the cuts captured in the past, but the present invention is not limited thereto. It is also possible to, for example, set the threshold with reference to the estimated number of takes by adding an element of the assumed number of takes to the cut information of the scenario information, or it is also possible to set the threshold with reference to the number of takes input by the user by configuring the video camera such that the user can input the assumed number of takes.

After the above-described process, in S314, a record preparation process is performed to transition to a recordable state. In S315, it is determined whether or not the recording medium has been changed. If it is determined that the recording medium has been changed, the procedure returns to S305, and the process is executed on the new recording medium.

If it is determined that the recording medium has not been changed, in S316, it is determined whether or not an instruction to read new scenario information from the auxiliary storage medium 105 has been issued through operation by the user. If it is determined that an instruction to read scenario information has been issued, in S317, it is determined whether or not a scene/cut has been selected using the scene/cut setting function. If it is determined that a scene and a cut have been selected, in S318, the number of takes that have been captured for the currently selected scene/cut is determined. If the number of takes that have been captured is 1 or more, in S319 and S320, the internal variables for calculating the average number of takes are updated. In S319, TakeNum, which is the number of takes that have been captured for the currently selected scene/cut, is added to TotalTake, which is the internal variable that holds the total number of takes captured in the past. In S320, because image capturing for the currently selected scene/cut is finished, 1 is added to TotalCut, which is the internal variable that holds the total number of cuts captured in the past. In S321, the selected scene/cut is deselected. In S322, scenario information is read from the auxiliary storage medium 105, and is overwritten and stored in the scenario information storage unit 106. Thereafter, the procedure returns to S315, and a display process in the deselected state is performed. The display in the deselected state is similar to that of the conventional video camera shown in FIG. 4A.

In S316, if it is determined that an instruction to read scenario information has not been issued, in S323, it is determined whether or not a scene/cut selection change process has been instructed through operation by the user. If it is determined that the scene/cut selection change process has been instructed, in S324, it is determined whether or not a scene/cut has been selected using the scene/cut setting function. If it is determined that a scene and a cut have been selected, in S325, the number of takes that have been captured for the currently selected scene/cut is determined. If the number of takes that have been captured is 1 or more, in S326 and S327, an internal variable update process for calculating the average number of takes as described above in connection with S319 and S320 is performed. In S328, the scenario information stored in the scenario information storage unit 106 is updated. The take element of the cut information for the currently selected scene number and cut number is updated with the number of takes that have been captured. By updating the take element, the number of takes that have been captured can be read when the scene/cut is again selected and recaptured after other cuts have been captured, and thus image capturing can be resumed from the continuous number of takes.

Next, in S329, it is determined whether the scene/cut selection change process determined in S323 is selection of another scene/cut or cancellation of the selection (the state in which no scenes/cuts have been selected). If the process is determined to be cancellation of the selection, the procedure returns to S305, and the process is repeated. If the process is determined to be selection of another scene/cut, in S330, a scene number and cut number selected as the scene number and cut number to be captured is set. After that, the scene information and cut information corresponding to the scene number and cut number are obtained from the scenario information stored in the scenario information storage unit 106. In S331, the number of takes that have been captured is obtained from the obtained cut information, and set in the internal variable TakeNum. In S332, it is determined whether or not the obtained number of takes that have been captured is 1 or more. If the obtained number of takes that have been captured is 1 or more, or in other words, if it is determined that the selected scene/cut have been captured before, image capturing for the scene/cut is resumed upon selection thereof. Accordingly, in S333, 1 is subtracted from the internal variable TotalCut, which indicates the number of cuts that have been captured. In S334, the number of takes that have been captured for the selected scene/cut is subtracted from the internal variable TotalTake, which indicates the total number of takes that have been captured, and the scene/cut selection change process ends. After the scene/cut selection change process, the procedure returns to S305, and a display process is performed according to the selection state of the changed scene/cut.

In S323, if it is determined that the scene/cut selection change process has not been instructed, then, in S335, it is determined whether or not recording has been started through operation by the user. If it is determined that recording has been started, in S336, a recording initiation process is performed. The controller 101 creates a new moving image file on the recording medium 111, and in the case of a scene and a cut having been selected inputs the scene number, the cut number and the take number into the metadata generator 109, and generates metadata, which is recorded in the header of the moving image file. After the created metadata has been recorded in the header of the moving image file, an image signal output by the camera unit 107 is processed on a frame-by-frame basis and recorded in a file. The image signal output by the camera unit 107 is input into the encoder 108, where the image signal is encoded into data in a predetermined format such as MPEG2 or H.264, and then input into the data multiplexer 110. The metadata generator 109 also internally includes a time code generator, and the controller 101 obtains a time code from the metadata generator 109 and inputs the time code into the data multiplexer 110. The data multiplexer 110 multiplexes, on a frame-by-frame basis, the encoded data input by the encoder 108 and the time code data input by the controller 101, and the multiplexed frame data is recorded in the file created in the recording medium 111. The recording process on a frame-by-frame basis is repeatedly executed until the recording is stopped.

The process spanning from S337 to S342 is repeatedly executed during the recording process, whereby the display of the recordable duration and the number of capturable takes is updated. In S337, the remaining capacity of the recording medium 111 is obtained. In S338, the recordable duration at the current settings is calculated from the obtained remaining capacity and the recording bit rate set in the video camera 100. In S339, the calculated recordable duration is displayed on the display unit 104. In S340, it is determined whether or not a scene and a cut have been selected using the scene/cut setting function. If it is determined that a scene and a cut have been selected, in S341, the number of takes capturable with the current settings is calculated from the recordable duration calculated in S338 and the cut length set in the duration element of the cut information obtained in S303 or S330. In S342, the number of capturable takes calculated in S341 is displayed.

In S343, it is determined whether or not an instruction to stop recording has been issued through operation by the user or due to insufficient capacity of the recording medium. If it is determined that an instruction to stop recording has not been issued, the procedure returns to S337, and the recording process on a frame-by-frame basis and the display update process are repeated. If it is determined that an instruction to stop recording has been issued, the controller 101 records the metadata including the moving image length and the like recorded in the created moving image file, and thereafter closes the file and stops the recording process. After the recording process has been stopped, in S345, it is determined whether or not a scene and a cut have been selected using the scene/cut setting function. If it is determined that a scene and a cut have been selected, in S346, the internal variable TakeNum, which indicates the number of takes that have been captured for the selected scene/cut, is updated by adding 1 thereto. When the recording process ends, the procedure returns to S305, and a display process is performed according to the state when recording ended.

If it is determined in S335 that recording has not been started, in S347, it is determined whether or not an instruction to end the image capturing mode has been issued by the mode being changed or by the power being turned off. If it is determined that an instruction to end the image capturing mode has not been issued, the procedure returns to S315, and the process of the image capturing mode is repeated. If it is determined that an instruction to end the image capturing mode has been issued, in S348, it is determined whether or not a scene and a cut have been selected using the scene/cut setting function. If it is determined that a scene and a cut have been selected, in S349, the scenario information stored in the scenario information storage unit 106 is updated. The take element of the cut information of the currently selected scene number and cut number is updated with the number of takes that have been captured. By updating the take element, the number of takes that have been captured for the selected scene/cut can be read when the video camera is activated in the image capturing mode the next time, and thus image capturing can be resumed from the continuous number of takes.

Through the operations described above, the number of takes capturable for the selected scene/cut can be displayed. Also, whether or not the recording medium in use is holding a capacity sufficient for image capturing is determined, and thus it is possible to inform the user when to replace the recording medium.

In the embodiment described above, an example has been described in which the number of takes capturable for the selected cut is displayed, but the following will give an example in which the number of takes capturable for the selected scene is displayed.

Figure 5:
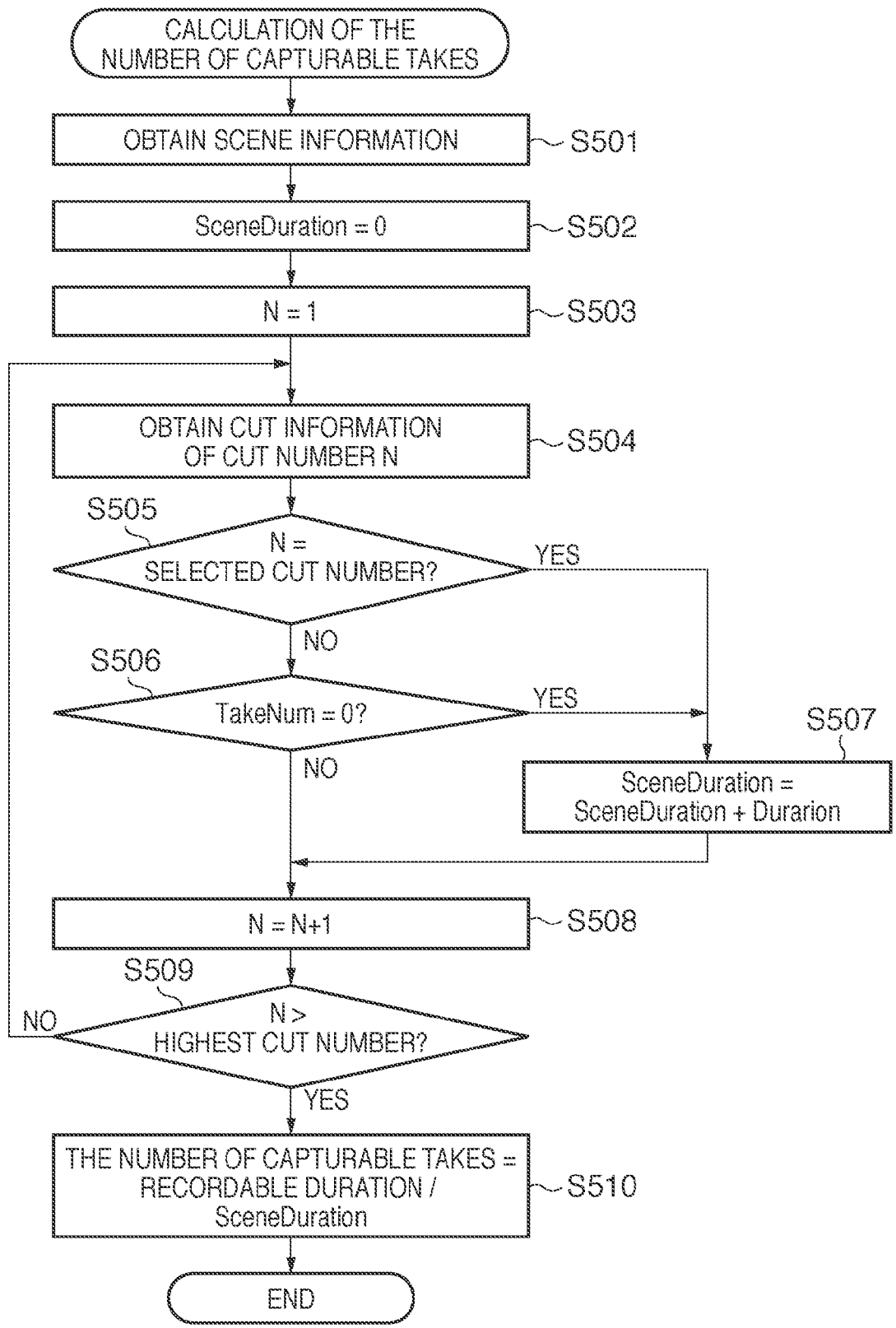
FIG. 5 is a flowchart illustrating operations of the video camera according to the embodiment of the present invention.

FIG. 5 is a flowchart illustrating a process for calculating the number of capturable takes. The flowchart shown in FIG. 5 corresponds to the process of S310 shown in FIG. 3A and S341 shown in FIG. 3C. Other processes are the same as described above.

In the case where a scene number and a cut number have been selected using the scene/cut setting function, in S501, scene information corresponding to the selected scene number is obtained from the scenario information storage unit 106. In S502, an internal variable SceneDuration that indicates the total cut length of the cuts included in the scene that have not been captured is initialized to 0. In S503, an internal counter variable N is initialized to 1.

In S504, cut information of cut number N is obtained. In S505, it is determined whether or not the internal counter variable N matches the selected cut number. If it is determined that the internal counter variable N matches the selected cut number, it indicates that the cut of cut number N is a cut that is to be captured next, or in other words, a cut that has not been captured. In S506, for the cut whose internal counter variable N does not match the selected cut number, it is determined whether or not the number of takes that have been captured included in the cut information obtained in S504 is 0. If it is determined that the number of takes that have been captured is 0, the cut is a cut that will be captured, or in other words, a cut that has not been captured.

If it is determined that the cut of cut number N has not been captured in S505 or S506, the procedure advances to S507. In S507, the cut length of the cut of cut number N is added to the internal variable SceneDuration, which indicates the total cut length of the cuts included in the scene that have not been captured. In S508, 1 is added to the internal counter variable N. In S509, a comparison is made between the internal counter variable N and the highest one of the cut numbers of the cuts included in the scene information. If the value of N is less than or equal to the highest cut number, the procedure returns to S504, and the process is repeated on the next cut information. If the value of N is greater than the highest cut number, it means that all of the cuts included in the scene information have been processed, and thus in S510, the recordable duration calculated in S306 of FIG. 3A or S338 of FIG. 3C is divided by the internal variable SceneDuration, whereby the number of takes capturable for the cuts of the selected scene that have not been captured is calculated.

Through the process described above, the number of takes capturable for all of the uncaptured cuts included in the scene including the selected cut can be displayed, and when the probability that a scene composed of a series of video images will not fit into one medium is high, it is possible to inform the user of the fact.

In the embodiment described above, an example has been described in which an alert message that recommends replacement of the recording medium is displayed, but it is also possible to present alternative video camera settings and image capture scenario, which will be described below.

Figure 6A:
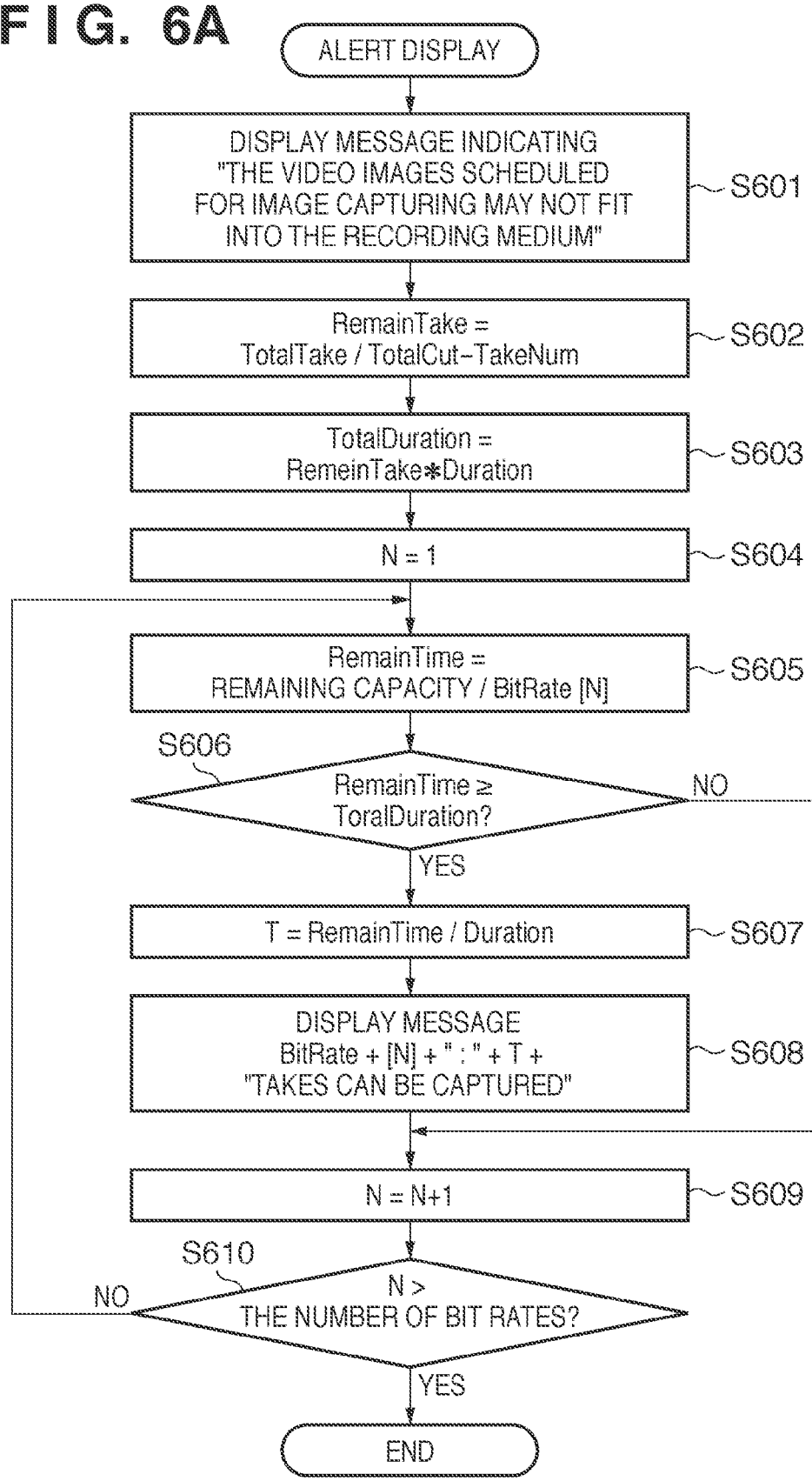
FIGS. 6A and 6B are flowcharts illustrating operations of the video camera according to the embodiment of the present invention.
Figure 6B:
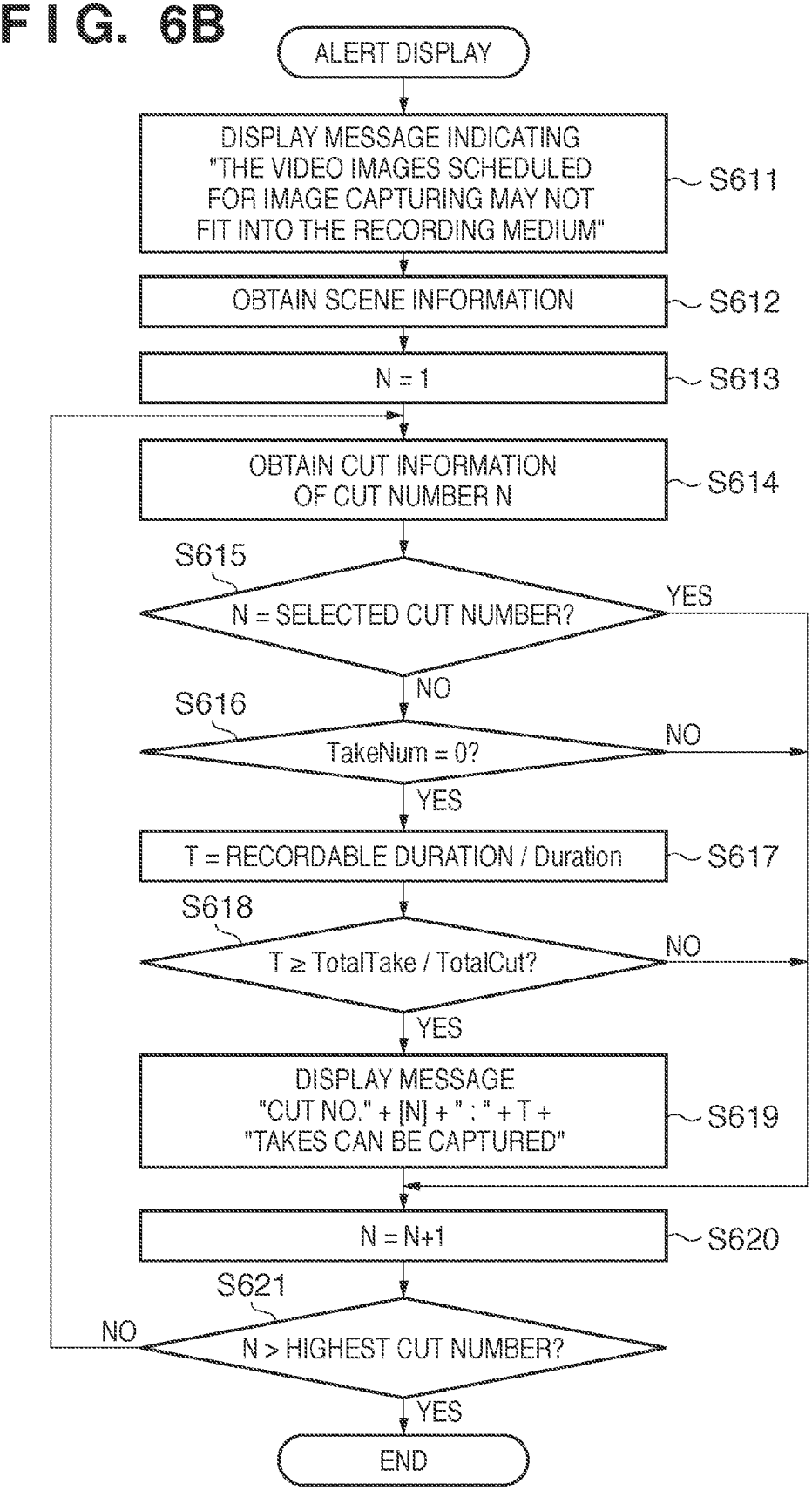

FIGS. 6A and 6B are flowcharts illustrating an alert message display process according to the present embodiment. The flowcharts shown in FIGS. 6A and 6B correspond to S313 of the flowchart shown in FIG. 3A. Other processes are the same as described above.

An example will be first described in which the video camera 100 presents recordable bit rates from among other settable bit rates, with reference to the flowchart of FIG. 6A. In the case where it is determined in S312 of FIG. 3A that it is highly likely that all of the takes to be captured for the currently selected scene/cut cannot be recorded, in S601, an alert message is displayed. In S602, an expected value of the number of takes to be captured for the selected scene/cut is set in an internal variable RemainTake. In S603, the duration required to capture that number of takes is calculated by multiplying the variable RemainTake by the cut length (Duration) of the selected scene/cut, and set in an internal variable TotalDuration.

In S604, the internal counter variable N is initialized to 1. In S605, the remaining capacity of the recording medium 111 obtained in S305 of FIG. 3A is divided by the Nth bit rate of a plurality of recording bit rates supported by the video camera 100. The recordable duration at the Nth bit rate is thereby calculated and set in an internal variable RemainTime. FIG. 9B shows example recording bit rates supported by the video camera 100. As shown in the diagram, the video camera 100 supports, for example, three types of recording bit rates. The user can select a recording bit rate on a menu or the like. In S606, it is determined whether or not the calculated RemainTime is greater than or equal to TotalDuration. If it is determined that RemainTime is greater than or equal to TotalDuration, it means that the recordable duration is sufficient at the Nth recording bit rate. Accordingly, in S607, the number of capturable takes is calculated by dividing RemainTime, which is the recordable duration at the Nth bit rate, by the cut length of the selected scene/cut, and set in an internal variable T. In S608, the Nth bit rate and the number of capturable takes when recording is performed at the Nth bit rate are displayed. In S609, 1 is added to the internal counter variable N. In S610, a comparison is made between the internal counter variable N and the number of bit rates supported by the video camera 100. If the value of N is less than or equal to the number of bit rates supported by the video camera 100, the procedure returns to S605, and the process is repeated on the next bit rate. If the value of N is greater than the number of bit rates supported by the video camera 100, it means that the process has been finished for all of the bit rates supported by the video camera 100, and thus the alert display process ends.

Figure 4D:
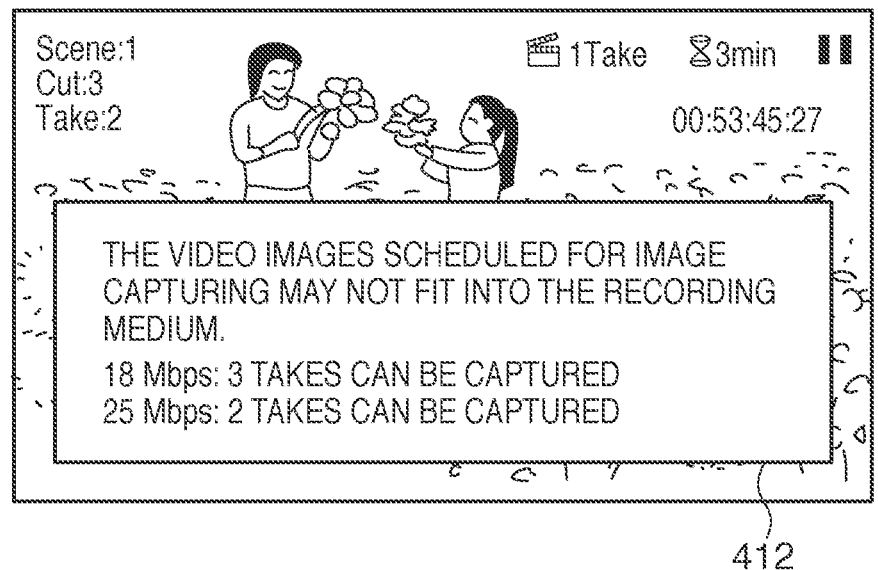

FIG. 4D shows an example of an alert display displayed in accordance with the flowchart of FIG. 6A. Reference numeral 412 indicates the alert display, and it is possible to present bit rates at which a sufficient number of takes can be captured, in addition to a alert message.

An example in which other recordable cuts are presented will be described next with reference to the flowchart of FIG. 6B. In the case where it is determined in S312 of FIG. 3A that it is highly likely that all of the tales to be captured for the currently selected scene/cut cannot be recorded, in S611, an alert message is displayed. In S612, scene information corresponding to the scene number of the selected scene/cut is obtained. In S613, the internal counter variable N is initialized to 1. In S614, cut information of cut number N is obtained. In S615, it is determined whether or not the internal counter variable N matches the selected cut number. If it is determined that the internal counter variable N matches the selected cut number, the procedure advances to S620, and the process is performed on the next cut number. If it is determined that the internal counter variable N does not match the selected cut number, in S616, it is determined whether or not the number of takes that have been captured included in the cut information obtained in S614 is 0. If the number of takes that have been captured is not 0, it means that the cut is a cut that has already been captured, and thus the procedure advances to S620, and the process is performed on the next cut number. If the number of takes that have been captured is 0, it means that the cut is a cut that has not yet been captured, and thus in S617, the number of takes capturable for the cut of cut number N is calculated by dividing the recordable duration calculated in S306 of FIG. 3A by the cut length of the cut of cut number N, and set in the internal variable T. In S618, it is determined whether or not the internal variable T is greater than or equal to the average number of takes in the past. If it is determined that the internal variable T is greater than or equal to the average number of takes in the past, it indicates that the recordable duration is sufficient to capture the cut of cut number N, and thus in S619, the cut number N and the number of takes capturable for the cut of cut number N are displayed. In S620, 1 is added to the internal counter variable N. In S621, the cut number N and the highest one of the cut numbers of the cuts included in the scene information are compared. If the value of N is less than or equal to the highest cut number, the procedure returns to S614, and the process is repeated on the next cut information. If the value of N is greater than the highest cut number, it means that all of the cuts included in the scene information have been processed, and thus the alert display process ends.

Figure 4E:
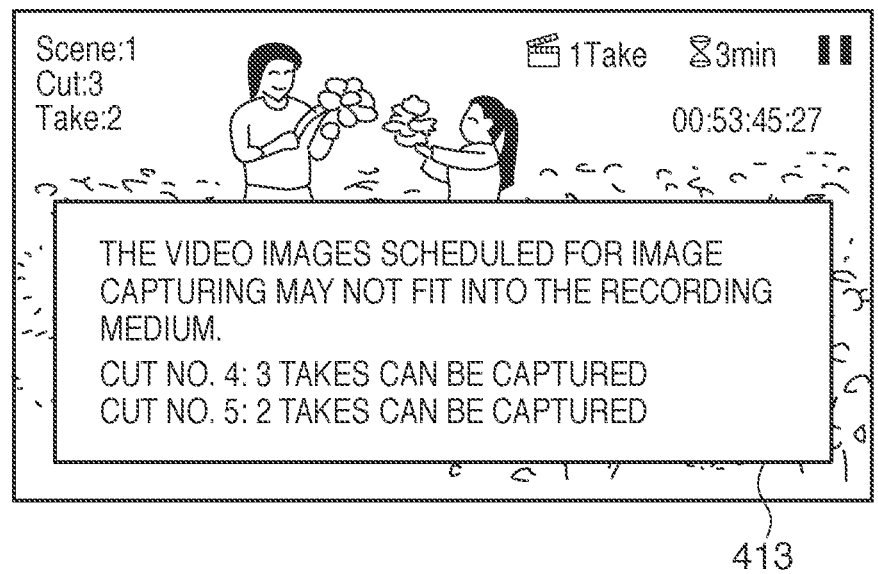

FIG. 4E shows an example of an alert display displayed in accordance with the flowchart of FIG. 6B. Reference numeral 413 indicates the alert display, and it is possible to present cut numbers for which a sufficient number of takes can be captured, in addition to an alert message.

Through the process described above, it is possible to present the user with the option to change the video camera settings or the content of image capturing, and the user can make effective use of the recording medium by making a change.

In the embodiment described above, an example has been described in which the threshold is set with reference to a single average number of takes irrespective of the cut length of the selected scene/cut, but it is also possible to calculate a plurality of average numbers of takes according to the cut length, which will be described below.

Figure 7A:
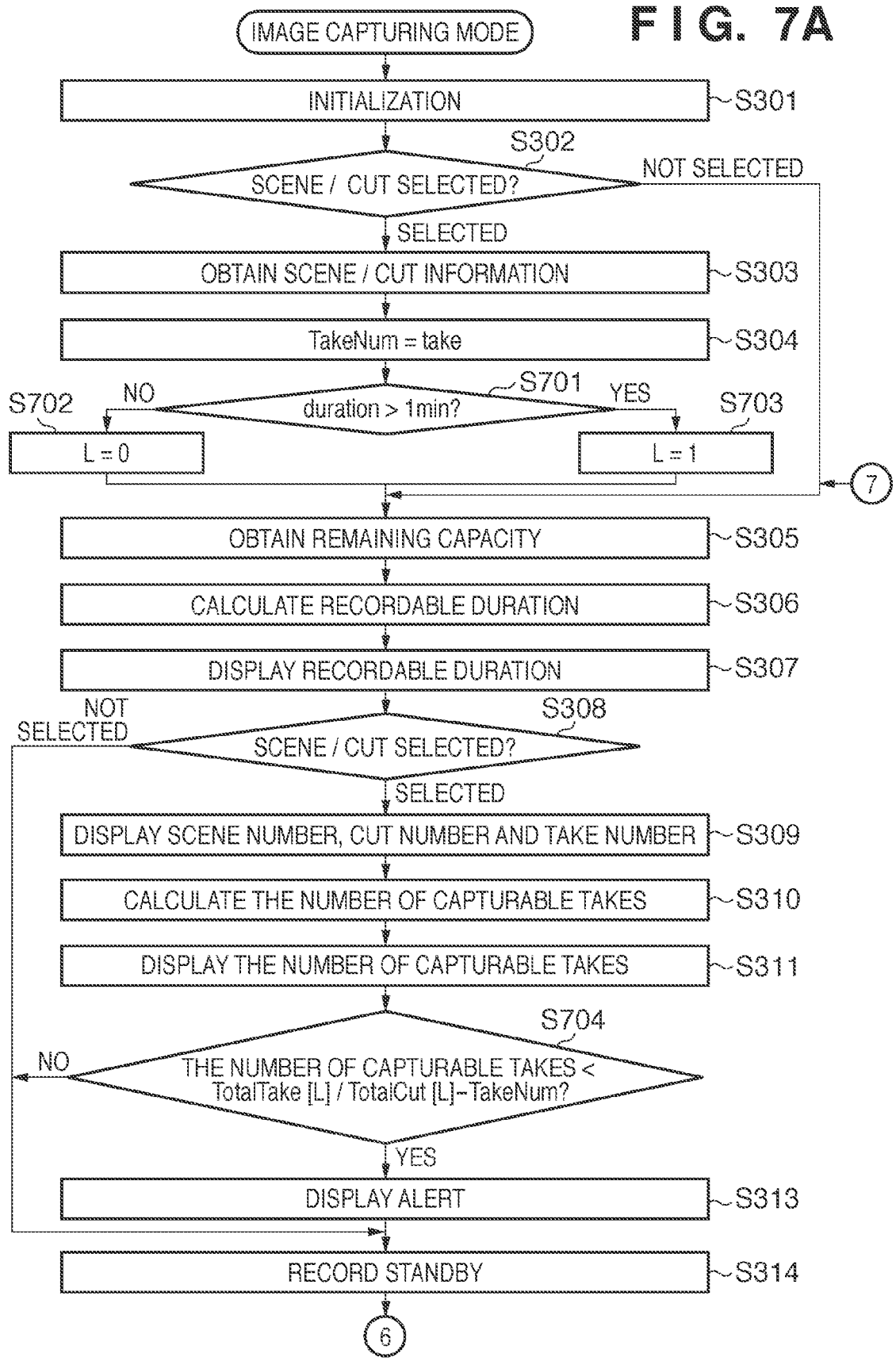
Figure 7B:
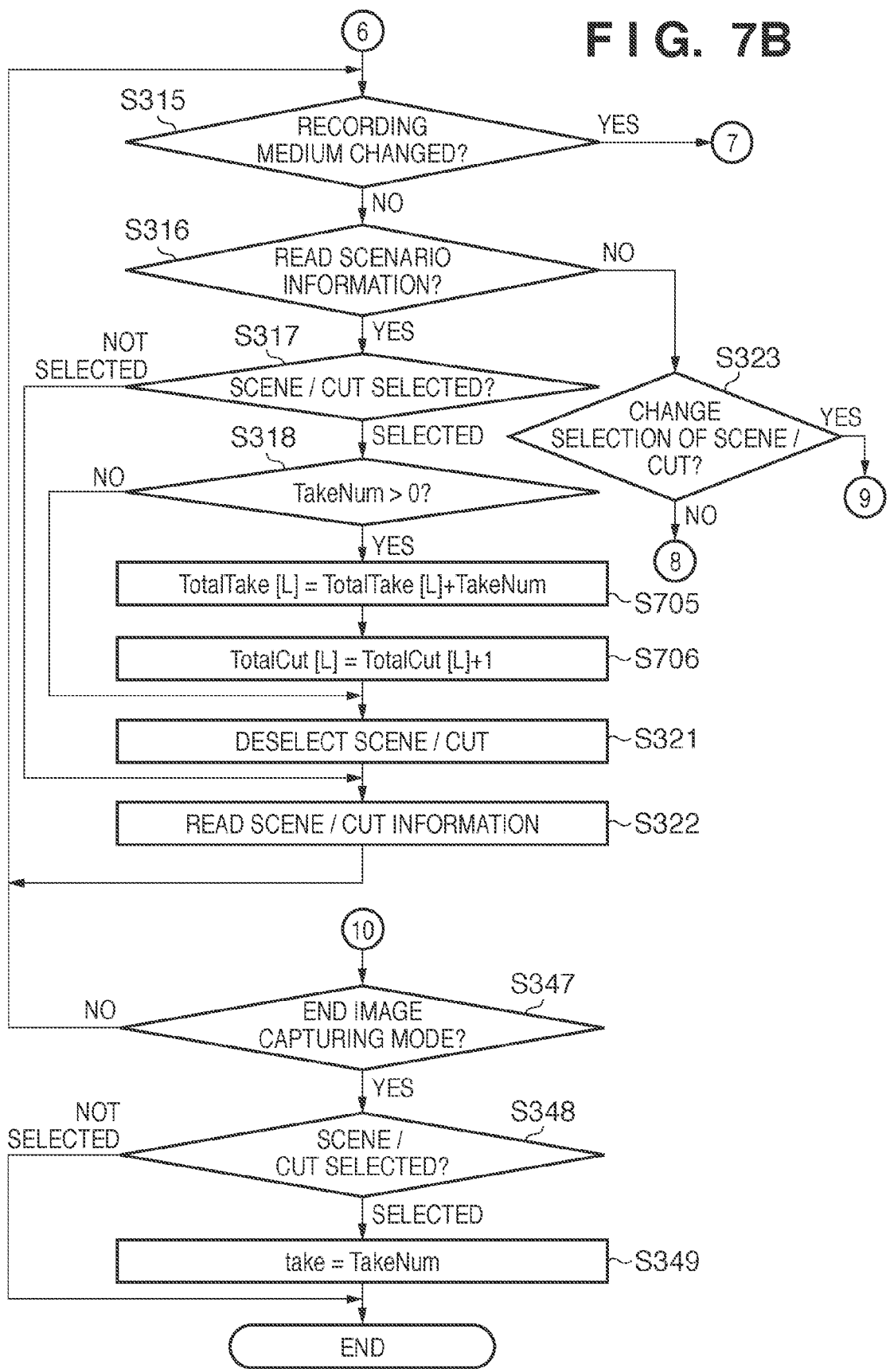

FIGS. 7A to 7C are flowcharts illustrating operations of the video camera 100 according to this embodiment. In FIGS. 7A to 7C, the same reference numerals are given to processing steps that are the same as those of the flowchart of FIGS. 3A to 3C described above, and a description thereof is omitted here. After the number of takes that have been captured for the selected scene/cut has been obtained in S304, in S701, it is determined whether or not the cut length of the selected scene/cut exceeds, for example, one minute. Here, the cut length is classified into two types: a short duration cut lasting for one minute or less; and a long duration cut lasting for more than one minute, and the average number of takes is calculated for each type. If the cut length is one minute or less, in S702, 0, which is the value indicating a short duration cut, is set in an internal variable L. If the cut length exceeds one minute, in S703, 1, which is the value indicating a long duration cut, is set in the internal variable L.

After the number of capturable takes has been displayed in S311, in S704, it is determined whether or not the number of capturable takes calculated in S310 is smaller than a predetermined threshold. In this example, the internal variable TotalTake holding the total number of takes captured in the past and the internal variable TotalCut holding the total number of cuts captured in the past are array variables. Also, the number of takes and the number of cuts are held for each type of the short duration cut and the long duration cut depending on the value of the internal variable L. Accordingly, in S704, a threshold that is adaptively compared is set depending on the cut length of the selected scene/cut.

In the case where it is determined in S316 that an instruction to read new scenario information from the auxiliary storage medium 105 has been issued through operation by the user and thereafter it is determined in S318 that the number of takes that have been captured is 1 or more, in S705 and S706, the internal variables for calculating the average number of takes are updated. In S705, TakeNum is added to the array element according to the cut length of the internal variable TotalTake. In S706, because image capturing for the currently selected scene/cut ends, 1 is added to the array element according to the cut length of the internal variable TotalCut.

In the case where it is determined in S323 that an instruction to perform the scene/cut selection change process has been issued through operation by the user and then it is determined in S325 that the number of takes that have been captured is 1 or more, the procedure advances to S707 and S708. In S707 and S708, an internal variable update process for calculating the average number of takes that is similar to that described in S705 and S706 is performed. In the case where it is determined in S329 that the process is selection of another scene/cut, the procedure advances to S709. In S709, it is determined whether or not the cut length of the selected scene/cut exceeds one minute, and depending on the result of determination, in S710 or S711, the value indicating a short duration cut or a long duration cut is set in the internal variable L.

With the operations described above, it is possible to make a comparison with the average number of takes depending on the cut length of the selected scene/cut, and therefore a highly accurate alert display can be performed according to the cut length. In this example, an example has been described in which the cut length is classified into two types, but it is also possible to perform an even more highly accurate process by increasing the array elements of the internal variables and the classification of the cut length.

Figure 8A:
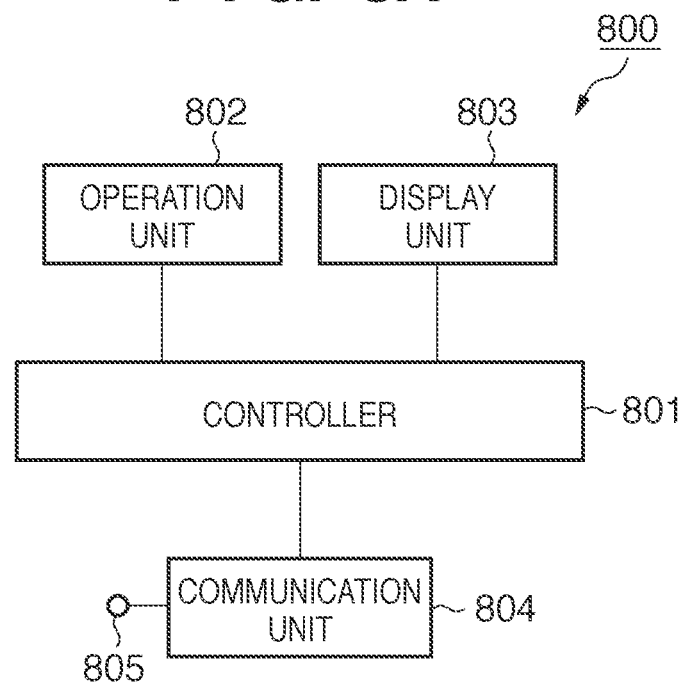
FIG. 8A is a block diagram of a remote controlling device according to an embodiment of the present invention.

In the embodiment described above, an example has been described in which the video camera alone executes the process, but the following will give an example in which the process is performed in a system including a video camera and a remote controlling device that externally controls the video camera. FIG. 8A is a block diagram showing an example configuration of a remote controlling device 800 for controlling a video camera. A controller 801 controls the operations of the remote controlling device 800. The user can operate the remote controlling device 800 via an operation unit 802. A display unit 803 displays various types of information. A communication unit 804 performs communication with the video camera via a connection terminal 805.

Figure 8B:
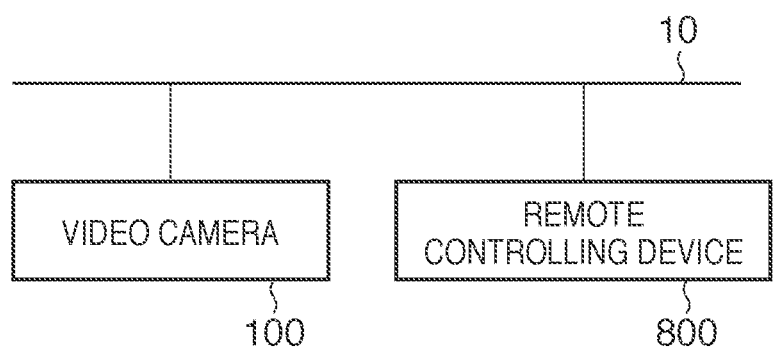
FIG. 8B is a diagram showing an example of a connection between the video camera and the remote controlling device according to the embodiment of the present invention.

FIG. 8B is a diagram showing a state in which the video camera 100 and the remote controlling device 800 have been connected to a network 10. The network 10 may be a wired network or a wireless network. The video camera 100 can connect to the network 10 via the connection terminal 115, and the remote controlling device 800 can connect to the network 10 via the connection terminal 805. The video camera 100 is assumed to be configured to operate according to any one of the embodiments described above and transmit, in response to a data retrieval request received from the remote controlling device 800, the corresponding data to the remote controlling device 800.

FIG. 10 is a flowchart illustrating operations of the remote controlling device 800. In S1001, a request for retrieving the remaining capacity of the recording medium 111 is made to the video camera 100 so as to obtain remaining capacity data. In S1002, a request for retrieving the recording bit rate that has been set is made to the video camera 100 so as to obtain recording bit rate data. In S1003, the recordable duration at the current settings is calculated from the remaining capacity obtained in S1001 and the recording bit rate obtained in S1002. In S1004, the calculated recordable duration is displayed on the display unit 803. In S1005, a request for retrieving the scene/cut information of the scene/cut set using the scene/cut setting function is made to the video camera 100 so as to obtain current settings data. In S1006, it is determined whether or not a scene/cut is currently selected based on the settings data obtained in S1005. If it is determined that a scene/cut is not currently selected, the process ends.

If it is determined that a scene/cut has been selected, in S1007, a request for retrieving cut information for the selected scene/cut is made to the video camera 100 so as to obtain the cut information. In S1008, a request for retrieving the number of takes that have been captured for the currently selected scene/cut is made to the video camera 100 so as to obtain the number of takes that have been captured. In S1009, a request for retrieving the average number of takes for the cut is made to the video camera 100 so as to obtain the average number of takes. In S1010, the number of takes capturable with the current settings is calculated from the recordable duration calculated in S1003 and the cut length set in the duration element of the cut information obtained in S1007. In S1011, the number of capturable takes calculated in S1010 is displayed.

In S1012, as in S312 of FIG. 3A, it is determined whether or not the number of capturable takes calculated in S1010 is smaller than a threshold set based on the average number of takes obtained in S1009 and the number of takes that have been captured obtained in S1008. If it is determined that the number of capturable takes is smaller than the threshold, it is regarded as highly likely that all of the takes for the selected scene/cut cannot be recorded, and thus in S1013, an alert is displayed on the display unit 803, and the process ends.

It is also possible to configure the remote controlling device to execute the process for calculating the number of capturable takes as described with reference to FIG. 5 or the alert display process as described with reference to FIGS. 6A and 6B.

As described above, it is also possible to configure the remote controlling device that externally controls the video camera to effect various displays according to the embodiments described above. In this case, confirmation can be effected in remote locations from the video camera.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-108677, filed May 10, 2010, which is hereby incorporated by reference herein in its entirety.

What is claimed is:

1. An apparatus comprising:
    an obtaining unit configured to obtain information corresponding to a selected cut number from scenario information, wherein the information corresponding to the selected cut number includes information which indicates a duration corresponding to the selected cut number;
    a calculation unit configured to calculate a recordable duration, and calculate how many times video data corresponding to the selected cut number can be taken, wherein the recordable duration is calculated based on a remaining capacity of a recording medium and a recording bit rate, and how many times video data corresponding to the selected cut number can be taken is calculated based on the calculated recordable duration and the duration corresponding to the selected cut number; and
    a display unit configured to display information which indicates how many times video data corresponding to the selected cut number can be taken,
    wherein if a number which indicates how many times video data corresponding to the selected cut number can be taken is smaller than a predetermined value, the display unit displays a message,
    wherein if the number which indicates how many times video data corresponding to the selected cut number can be taken is smaller than the predetermined value, the calculation unit calculates how many times video data corresponding to another cut number can be taken, information corresponding to said another cut number is included in the scenario information, and
    wherein if the number which indicates how many times video data corresponding to the selected cut number can be taken is smaller than the predetermined value, the display unit displays information indicating how many times video data corresponding to said another cut number can be taken.

2. The apparatus according to claim 1, wherein the message is a message relating to a replacement of the recording medium.

3. The apparatus according to claim 1, wherein the calculation unit calculates how many times video data corresponding to the selected cut number can be taken at another recording bit rate instead of calculating how many times video data corresponding to said another cut number can be taken, and the display unit displays information indicating how many times video data corresponding to the selected cut number can be taken at said another recording bit rate instead of displaying information indicating how many times video data corresponding to said another cut number can be taken.

4. The apparatus according to claim 1, wherein the predetermined value is a value set based on an average of how many times video data corresponding to each cut number is taken.

5. The apparatus according to claim 1, wherein the predetermined value is a value inputted by a user.

6. The apparatus according to claim 1, wherein the apparatus is an imaging apparatus.

7. The apparatus according to claim 1, wherein the apparatus is a recording apparatus.

8. The apparatus according to claim 1, wherein the apparatus includes a camera.

9. A method comprising:
    obtaining information corresponding to a selected cut number from scenario information, wherein the information corresponding to the selected cut number includes information which indicates a duration corresponding to the selected cut number;

calculating a recordable duration, wherein the recordable duration is calculated based on a remaining capacity of a recording medium and a recording bit rate;

calculating how many times video data corresponding to the selected cut number can be taken, wherein how many times video data corresponding to the selected cut number can be taken is calculated based on the calculated recordable duration and the duration corresponding to the selected cut number;

displaying information which indicates how many times video data corresponding to the selected cut number can be taken;

displaying a message if a number which indicates how many times video data corresponding to the selected cut number can be taken is smaller than a predetermined value;

calculating how many times video data corresponding to another cut number can be taken if the number which indicates how many times video data corresponding to the selected cut number can be taken is smaller than the predetermined value, wherein information corresponding to said another cut number is included in the scenario information; and displaying information indicating how many times video data corresponding to said another cut number can be taken if the number which indicates how many times video data corresponding to the selected cut number can be taken is smaller than the predetermined value.

10. The method according to claim 9, wherein the message is a message relating to a replacement of the recording medium.

11. The method according to claim 9, further comprising:

calculating how many times video data corresponding to the selected cut number can be taken at another recording bit rate instead of calculating how many times video data corresponding to said another cut number can be taken; and displaying information indicating how many times video data corresponding to the selected cut number can be taken at said another recording bit rate instead of displaying information indicating how many times video data corresponding to said another cut number can be taken.

12. The method according to claim 9, wherein the predetermined value is a value set based on an average of how many times video data corresponding to each cut number is taken.

13. The method according to claim 9, wherein the predetermined value is a value inputted by a user.

14. A non-transitory computer-readable storage medium that stores a program for causing a computer to execute a method, the method comprising:

obtaining information corresponding to a selected cut number from scenario information, wherein the information corresponding to the selected cut number includes information which indicates a duration corresponding to the selected cut number;

calculating a recordable duration, wherein the recordable duration is calculated based on a remaining capacity of a recording medium and a recording bit rate;

calculating how many times video data corresponding to the selected cut number can be taken, wherein how many times video data corresponding to the selected cut number can be taken is calculated based on the calculated recordable duration and the duration corresponding to the selected cut number;

displaying information which indicates how many times video data corresponding to the selected cut number can be taken;

displaying a message if a number which indicates how many times video data corresponding to the selected cut number can be taken is smaller than a predetermined value;

calculating how many times video data corresponding to another cut number can be taken if the number which indicates how many times video data corresponding to the selected cut number can be taken is smaller than the predetermined value, wherein information corresponding to said another cut number is included in the scenario information; and displaying information indicating how many times video data corresponding to said another cut number can be taken if the number which indicates how many times video data corresponding to the selected cut number can be taken is smaller than the predetermined value.

* * * * *